United States Patent
Louw et al.

(10) Patent No.: US 9,714,089 B1
(45) Date of Patent: Jul. 25, 2017

(54) TRIGGER AGENTS IN VIDEO STREAMS FROM DRONES

(71) Applicant: Amazon Technologies, Inc., Seattle, WA (US)

(72) Inventors: David Brian Louw, San Luis Obispo, CA (US); Robert James Silk, Morro Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/866,770

(22) Filed: Sep. 25, 2015

(51) Int. Cl.
*B64C 39/02* (2006.01)
*G05D 1/10* (2006.01)
*B64D 47/08* (2006.01)
*B64C 27/08* (2006.01)

(52) U.S. Cl.
CPC ............ *B64C 39/024* (2013.01); *B64C 27/08* (2013.01); *B64D 47/08* (2013.01); *G05D 1/101* (2013.01); *B64C 2201/128* (2013.01)

(58) Field of Classification Search
None
See application file for complete search history.

(56) References Cited

U.S. PATENT DOCUMENTS

| | | | |
|---|---|---|---|
| 2016/0116915 A1* | 4/2016 | Pulleti | G01S 13/56 701/3 |
| 2016/0239803 A1* | 8/2016 | Borley | G06Q 10/0833 |
| 2016/0253908 A1* | 9/2016 | Chambers | G08G 5/0069 701/2 |
| 2016/0301859 A1* | 10/2016 | Tebay | G05D 1/0094 |
| 2016/0306356 A1* | 10/2016 | Tebay | G05D 1/0094 |
| 2016/0307447 A1* | 10/2016 | Johnson | G01C 21/00 |
| 2017/0011333 A1* | 1/2017 | Greiner | G06Q 10/083 |

\* cited by examiner

*Primary Examiner* — Krishnan Ramesh
(74) *Attorney, Agent, or Firm* — Kilpatrick Townsend & Stockton LLP

(57) ABSTRACT

Techniques are provided for analyzing data obtained while delivering items with unmanned aerial vehicles. For example, instructions may be provided to an unmanned aerial vehicle to deliver an item. The unmanned aerial vehicle may be configured to record data while delivering the item. In embodiments, the captured data may be received by a computer system and properties about a destination for the delivery may be identified by analyzing the data. A recommendation may be generated based at least in part on the identified properties.

17 Claims, 10 Drawing Sheets

US 9,714,089 B1

TRIGGER AGENTS IN VIDEO STREAMS FROM DRONES

BACKGROUND

A delivery service may deliver items to its customers in a variety of different ways. For example, an item ordered by a customer from an electronic marketplace may be removed from a shelf in a warehouse by a human picker, loaded into a freight truck, transferred to a delivery van, and delivered to the customer's doorstep by a delivery person. In some cases, the item may also be transported by an airplane, a train, a motorcycle, a bicycle, or any combination of the foregoing. However, current delivery techniques may not enable a very robust ability to recognize physical issues with delivery destinations.

BRIEF DESCRIPTION OF THE DRAWINGS

Various embodiments in accordance with the present disclosure will be described with reference to the drawings, in which.

DETAILED DESCRIPTION

Figure 1:
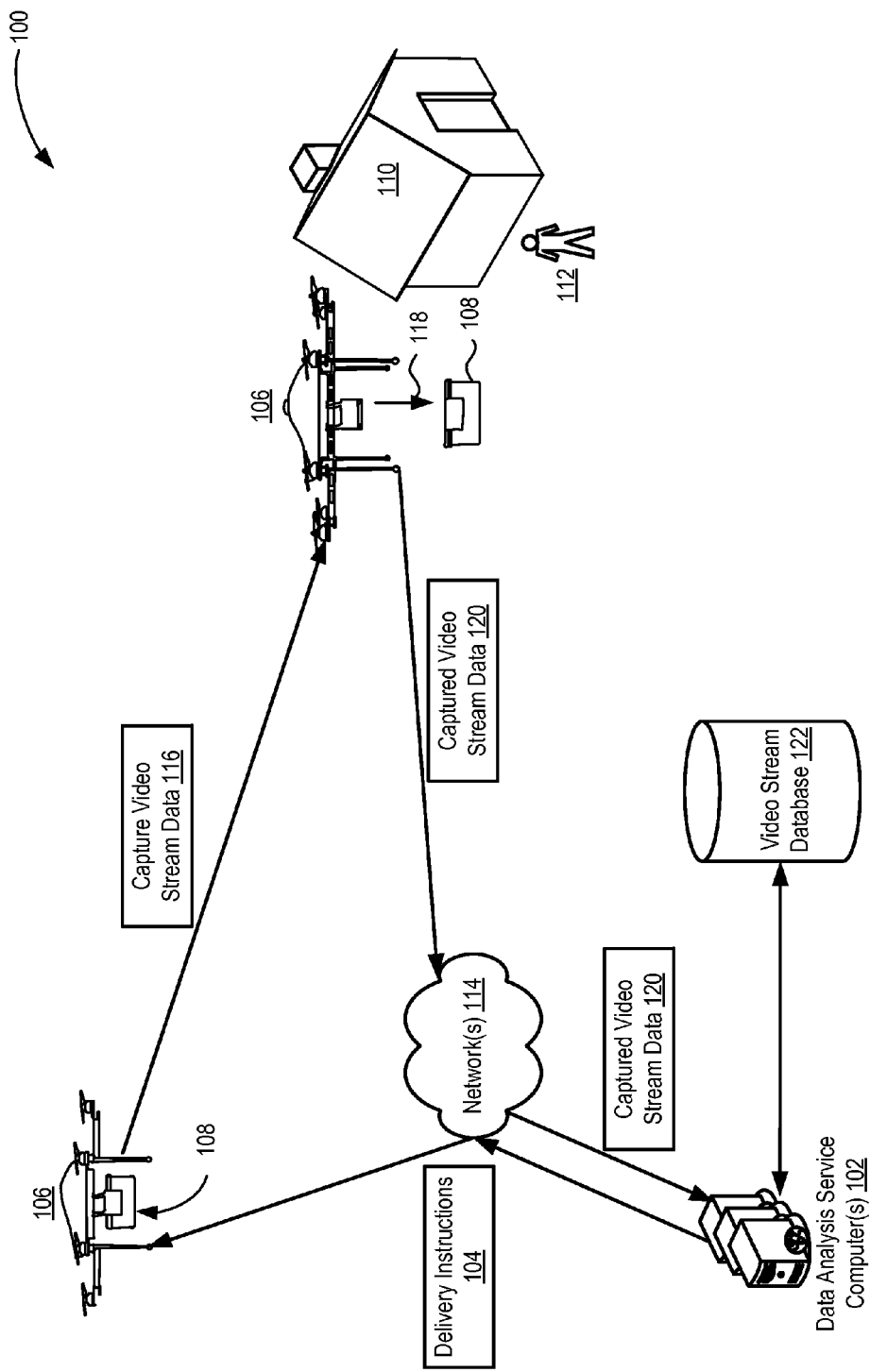
FIG. 1 illustrates an example data flow for a data analysis service associated with delivering an item from an electronic marketplace as described herein, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include embodiments directed to analyzing location data while delivering an item with an unmanned aerial vehicle (UAV) to identify properties about the location associated with the delivery as requested by the property owner. The techniques, however, may be applicable to interaction with other unmanned vehicles, whether aerial or otherwise, or intended for delivery or otherwise. In the context of this specification, unmanned aerial vehicles may be configured with data capturing devices (e.g., video cameras, cameras, microphones, audio sensors, etc.,) for capturing data while delivering an item as permitted. For example, an unmanned aerial vehicle may capture and/or record video data while delivering an item to a customer. The unmanned aerial vehicle may access a delivery plan that includes a delivery location associated with a human recipient. As the unmanned aerial vehicle makes its way to the delivery location, it may capture data such as video data or audio data as requested by the property owner associated with the delivery location. The location data may be stored (e.g., temporarily in a cache or more permanently) and/or analyzed locally. Alternatively, the location data may be transmitted to a server computer system, where the data may be stored and/or analyzed as permitted.

The location data may be analyzed by one or more service provider computers (which, as used herein, could be located on the unmanned aerial vehicles) that are configured to implement embodiments described herein; for example, to identify properties about a location (e.g., associated with the customer) as allowed. In accordance with at least one embodiment, the one or more service provider computers may utilize image recognition or video recognition techniques for identifying interesting or unique properties associated with the delivery location. For example, the one or more service provider computers may analyze the data and identify that the roof of the location is in disrepair and in need of service. Subsequently, the one or more service provider computers may generate and provide a recommendation to the customer informing them of the identified property and offering an item or service that is appropriate for the identified property (e.g., a roof repair service recommendation). As will be discussed in more detail below, data analysis and subsequent actions may be performed by the unmanned aerial vehicle while capturing the footage and delivering the item, by the vehicle at a later time upon the return of the unmanned aerial vehicle after delivering the item and/or by server computers either during or after the delivery as permitted or requested by users associated with the service or on behalf of users that have opted-in to the features of the service described herein.

In a non-limiting example, a user, who has opted-in to the service described herein, may order an item for delivery from an electronic marketplace. Service provider computers associated with the electronic marketplace may provide instructions to an unmanned aerial vehicle to deliver the ordered item to the user's home according to a delivery plan. Thereafter, as the unmanned aerial vehicle is in flight and delivering the item, data may be captured by the vehicle and transmitted back to the service computers for data analysis. For example, the unmanned aerial vehicle may capture video data that includes brown and dying trees located near the user's home. The service provider computers may utilize image and/or video recognition techniques and software to identify that the trees require service (e.g., services that can be provided by an arborist). The service provider computers may, in response to identifying that the trees near the user's home are dying, generate and provide a recommendation to the user that includes information about arborist services or items such as fertilizers that can help the user's trees. The recommendation may be provided to the user via an email, a short message service (SMS) text, or it could appear as a notification the next time the user visits a web page associated with the electronic marketplace. In an embodiment, the recommendation may be generated based at least in part on data maintained by an electronic marketplace including data about a recommended item, service, or on the user that requested the item for delivery (for example based on a user profile for the user maintained by the electronic marketplace that includes suitable user preference information for the user).

Turning now to the figures, FIG. 1 illustrates an example data flow 100 for a data analysis service associated with delivering an item from an electronic marketplace as described herein, according to embodiments. FIG. 1 includes data analysis service computers 102 providing delivery instructions 104 to an unmanned aerial vehicle 106 to deliver an item 108. In accordance with at least one embodiment, the delivery instructions 104 may include a delivery plan that includes a location 110, such as a home or office, associated with a user 112 that ordered item 108. The delivery instructions 104 may be provided over one or more networks 114. In the data flow 100, as the unmanned aerial vehicle 106 delivers the item 108 to the location 110, video stream data 116 may be captured by an image capturing device associated with the unmanned aerial vehicle 106. The video stream data 116 may include images and video data captured by the unmanned aerial vehicle 106 during its delivery plan and can include any suitable data captured while in flight and delivering the item 108 to the location 110. For example, the video stream data 116 may include video recordings of the streets, cars, foliage, etc., that the unmanned aerial vehicle 106 flies over while delivering the item 108 to the location 110. In embodiments, the video data may include video data captured utilizing infrared and/or night-vision capturing devices. The delivery plan and/or delivery instructions 104 may instruct the unmanned aerial vehicle 106 to deliver the item 108 to location 110 via autonomous flight instructions, semi-autonomous flight instructions, or remotely controlled flight instructions provided by a technician associated with the data analysis service described herein.

In embodiments, as the unmanned aerial vehicle 106 delivers 118 the item 108 to the location 110, the video stream data 116 may include images and video of the location 110 or destination location as indicated by the delivery instructions 104 or delivery plan. For example, the video stream data 116 may include video recordings or images of the location 110, the surrounding yard, and neighborhood from an aerial view. Video or images that contain people may be immediately deleted, or not captured at all, without the consent of the people being recorded. For example, if the recording device identifies a person, the image/video capturing may be automatically turned off for a particular amount of time to ensure that no people are filmed. In accordance with at least one embodiment, the unmanned aerial vehicle 106 may provide the captured video stream data 120, via the one or more networks 114, to the data analysis service computers 102. The unmanned aerial vehicle 106 may provide the captured video stream data 120 periodically (e.g., may transmit the video stream data 120 every ten minutes), in a real time continuous stream, or it may locally store the captured video stream data 120 until it lands at or is near an item source location that is associated with the data analysis service computers 102 and/or the electronic marketplace. In embodiments, the item source location may be a fulfillment center, warehouse, data center, or other structure that is associated with the electronic marketplace and/or that is associated with the data analysis services or one or more third parties.

Thus, it should be appreciated that although FIG. 1 illustrates the unmanned aerial vehicle 106 providing the captured video stream data 120 upon delivery 118 of the item 108 to the location 110, embodiments described herein equally apply to the provision of the captured video stream data 120 continuously or periodically while in flight or during delivery of the item 108. In an embodiment, the data analysis service computers 102 may store the received video stream data 120 in a database such as video stream database 122 for off-line or subsequent analysis. The data analysis service computers 102 may identify unique or interesting properties within the captured video stream data 120 as the data comes in (continuous stream) or periodically depending on the method of provision of the captured video stream data 120 employed by the unmanned aerial vehicle 106.

Figure 2:
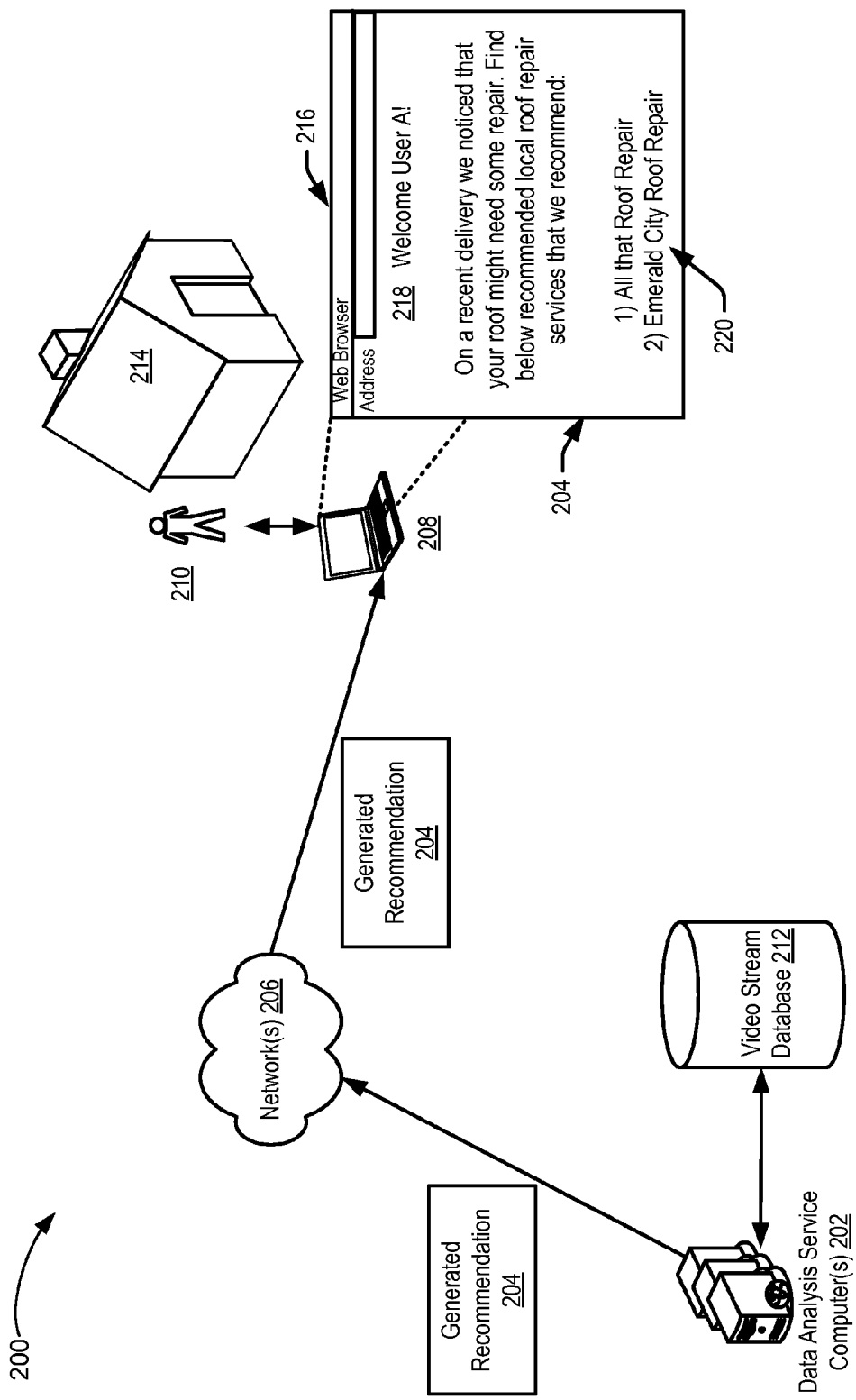
FIG. 2 illustrates an example data flow for a data analysis service associated with delivering an item from an electronic marketplace as described herein, according to embodiments.

FIG. 2 illustrates an example data flow 200 for a data analysis service associated with delivering an item from an electronic marketplace as described herein, according to embodiments. The data flow 200 includes data analysis service computers 202 generating and providing a recommendation 204 via one or more networks 206 to a user device 208 associated with a user 210. In accordance with at least one embodiment, the data analysis service computers 202 may identify one or more properties in the received or obtained video stream data provided by an unmanned aerial vehicle while delivering an item (See FIG. 1). In embodiments, the properties identified by the data analysis service computers 202 may serve as triggers for performing some action or providing instructions to perform an action by the unmanned aerial vehicle, the data analysis service computers 202, by a technician associated with the data analysis service computers 202, third parties, or by a user.

Identified properties that may trigger an action include any suitable anomalies, inconsistencies, irregularities, or aberrations that deviate from an expected or normal state for an object, location, environmental factor, or metric. Examples of identified properties which may trigger an action include, but are not limited to, video data that indicates a loose or missing roof tile, smoke coming from a building, brown grass, bent or partially fallen trees, structural integrity issues, and/or audio data that indicates gun shots, cries for help, breaking glass, and/or audio that exceeds a particular threshold. In embodiments, the data analysis service computers 202 may identify the properties included in the captured data from the unmanned aerial vehicle utilizing image recognition techniques, video data pattern recognition techniques, and audio recognition techniques. In accordance with at least one embodiment, the data analysis service computers 202 may identify properties by identifying differences or inconsistencies from a baseline associated with a particular location. For example, the data analysis service computers 202 may obtain data provided by the unmanned aerial vehicle for a plurality of locations and establish a baseline property (image, video, and/or audio) to associate with each location. Thereafter, subsequent data provided by the unmanned aerial vehicles can be compared with the baseline to identify any changes or any of the properties described herein. In a non-limiting example, a baseline property may be established for a particular user's roof indicating the condition of the tiles and the placement of the tiles for the user's roof. Thereafter, upon delivering an item, the unmanned aerial vehicle may capture new data and analyze to identify a property indicating an inconsistency when compared to the previously specified baseline property. In response to identifying the inconsistency, the data analysis service computers 202 may generate the recommendation 204 and provide it to the user device 208 for presentation to the user 210.

In accordance with at least one embodiment, identified properties may trigger an action such as communicating with an entity such as a user, a third party, or technician associated with the content analysis services. For example, an unmanned aerial vehicle during its delivery of an item to a user may detect that smoke is coming from the delivery location indicated by the delivery plan. The identification of the smoke property may trigger the unmanned aerial vehicle to utilize communication capabilities to alert emergency service. In some examples, the data analysis service computers 202 may provide instructions to call emergency services and provide information about the location upon receiving the identified property or identifying the property from raw data provided by the unmanned aerial vehicle.

The data analysis service computers 202 may utilize supervised machine learning algorithms to identify the anomalies or inconsistencies between a baseline property and newly obtained data regarding a location as described herein. The data analysis service computers 202 may store and maintain the baseline properties for the plurality of locations in a data store such as video stream database 212. In accordance with at least one embodiment, the generated recommendation 204 may include information about a service or an item that is associated with the identified property about the location. For example, an unmanned aerial vehicle may have captured video data that includes an image of a house 214 associated with the user 210. The data analysis service computers 202 may have identified that the roof of the house 214 is in need of repair because of missing roof tiles included in the video data. In embodiments, the generated recommendation 204 may be provided via a web page that is configured to be presented in a web browser. FIG. 2 illustrates the generated recommendation 204 being presented via a web browser 216 on the user device 208. The generated recommendation may identify 218 the user 210 and include information about the identified property and the recommended services or items 220. The information about the identified property and the recommended services or items 220 in FIG. 2 includes information about a roof in repair and several recommended services for fixing the roof. As such, the data analysis service associated with the delivery of an item is able to identify properties about a location associated with a user and provide recommendations for items and services thus improving overall customer experience.

Figure 3:
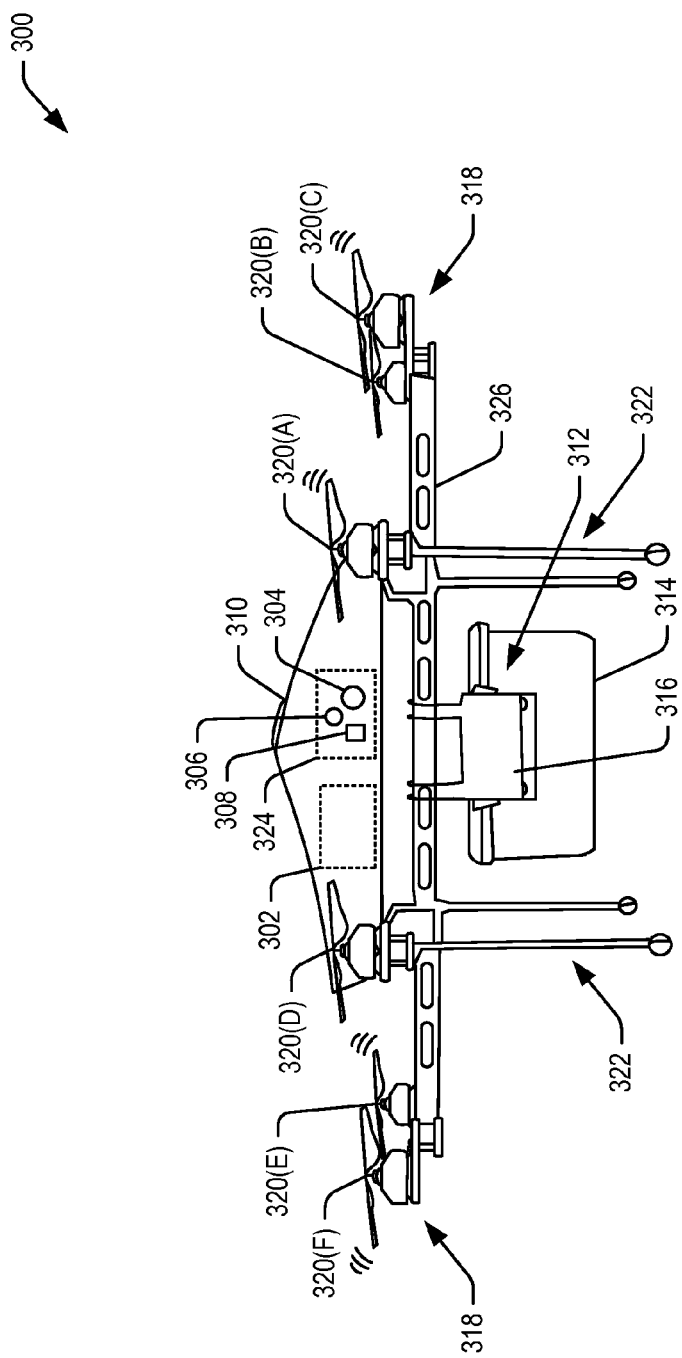
FIG. 3 illustrates an example device for implementing techniques relating to a data analysis service associated with delivering an item as described herein, according to embodiments.

FIG. 3 illustrates an example UAV 300 for implementing techniques relating to data analysis service associated with delivering an item as described herein, according to at least one example. The UAV 300 is an example of the UAV 106 discussed with reference to FIG. 1. The UAV 300 may be designed in accordance with commercial aviation standards and may include multiple redundancies to ensure reliability. For purposes of this specification, the UAV 300 may include a plurality of systems or subsystems operating under the control of, or at least partly under the control of, a management system 302. The management system 302 may include an onboard computer for autonomously or semi-autonomously controlling and managing the UAV 300 and, in some examples, for enabling remote control by a pilot. The onboard computer will be discussed in more detail with reference to FIG. 4. Portions of the management system 302, including the onboard computer, may be housed under top cover 310. As used herein, the management system 302 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 300 and detecting objects) (not shown), radio-frequency identification (RFID) capability (not shown), interfaces capable of speech interpretation and recognition (not shown), and one or more data capturing mechanisms (e.g., cameras, video recorders, microphones, infrared sensors, motion detectors, time of flight signal technology) (not shown).

The UAV 300 may also include a communication system 324 housed within the top cover 310. The communication system 324 may include one or more light sensors 304 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 306 (e.g., microphone, noise filters, and other sensors for capturing sound), and one or more output devices 308 (e.g., microphone, speaker, laser projector, light projector, and other devices for outputting communication information). The management system 302 may be configured to receive information and provide information via components of the communication system 324. For example, information may be received (e.g., video or image data) via the light sensor 304 and the auditory sensor 306 and information may be provided (e.g., verbal statements, requests, or questions using the speech interface, flashing lights, and other ways discussed herein for providing information) via the output device 308. Thus, in some examples, the UAV 300 may support two-way communication with users or bystanders. Two-way communication may be beneficial for verifying a potential recipient's identity, for posing questions to a potential recipient or to other human users, and for providing instructions to a potential recipient or to other users, e.g., relating to delivery of a package. In some examples, the communication system 324 may operate semi-autonomously or autonomously. In an embodiment, the communication system 324 may be configured to provide information captured by the one or more light sensors 304 and one or more auditory sensors 306 to data analysis service computers for further property identification analysis.

As shown in FIG. 3, the UAV 300 may also include a retaining system 312. The retaining system 312 may be configured to retain payload 314. In some examples, the retaining system 312 may retain the payload 314 using friction, vacuum suction, opposing arms, magnets, and other retaining methods. As illustrated in FIG. 3, the retaining system 312 may include two opposing arms 316 (only one is illustrated) configured to retain the payload 314. The management system 302 may be configured to control at least a portion of the retaining system 312. In some examples, the retaining system 312 may be configured to release the payload 314 in one of a variety of ways. For example, the retaining system 312 (or other system of the UAV 300) may be configured to release the payload 314 with a winch and spool system, by the retaining system 312 releasing the payload, and other methods of releasing the payload. In some examples, the retaining system 312 may operate semi-autonomously or autonomously.

In FIG. 3, the payload 314 is illustrated as a delivery box. In some examples, the delivery box may include one or more packages or items intended for delivery to a recipient using the techniques described herein. The payload 314, whether as a delivery box or otherwise, may be configured for delivery using a variety of different methods. For example, the payload 314 may include a parachute that opens and slows the payload's 314 descent as it falls to its delivery location. In some examples, the payload 314 may include padding surrounding its package to reduce the impact of a drop from the UAV 300 above the ground. The UAV 300 may also deliver the payload 314 by fully landing on the ground and releasing the retaining system 312.

Further, the UAV 300 may include propulsion system 318. In some examples, the propulsion system 318 may include rotary blades or otherwise be a propeller-based system. In some examples, the propulsion system 318 may include or be associated with one or more fixed wings. As illustrated in FIG. 3, the propulsion system 318 may include a plurality of propulsion devices, a few of which, 320(A)-320(F), are shown in this view. Each propeller device may include one propeller, a motor, wiring, a balance system, a control mechanism, and other features to enable flight. In some examples, the propulsion system 318 may operate at least partially under the control of the management system 302. In some examples, the propulsion system 318 may be configured to adjust itself without receiving instructions from the management system 302. Thus, the propulsion system 318 may operate semi-autonomously or autonomously. The propulsion system 318 may enable multi-directional flight of the UAV 300 (e.g., by adjusting each propeller device individually). In this manner, the UAV 300 may be configured to respond to instructions included in a delivery plan or from a pilot to capture data including performing a quick pass, a detailed flight pass over a particular location, and zoom in or zoom out flight paths for capturing data about a location or situation while delivering an item. The UAV 300 may also include landing structure 322. The landing structure 322 may be adequately rigid to support the UAV 300 and the payload 314. The landing structure 322 may include a plurality of elongated legs that may enable the UAV 300 to land on and take off from a variety of different surfaces. The plurality of systems, sub-systems, and structures of the UAV 300 may be connected via frame 326. The frame 326 may be constructed of a rigid material and be capable of receiving via different connections the variety of systems, sub-systems, and structures. For example, the landing structure 322 may be disposed below the frame 326 and, in some examples, may be formed from the same material and/or same piece of material as the frame 326. The propulsion system 318 may be disposed radially around a perimeter of the frame 326 or otherwise distributed around the frame 326.

Figure 4:
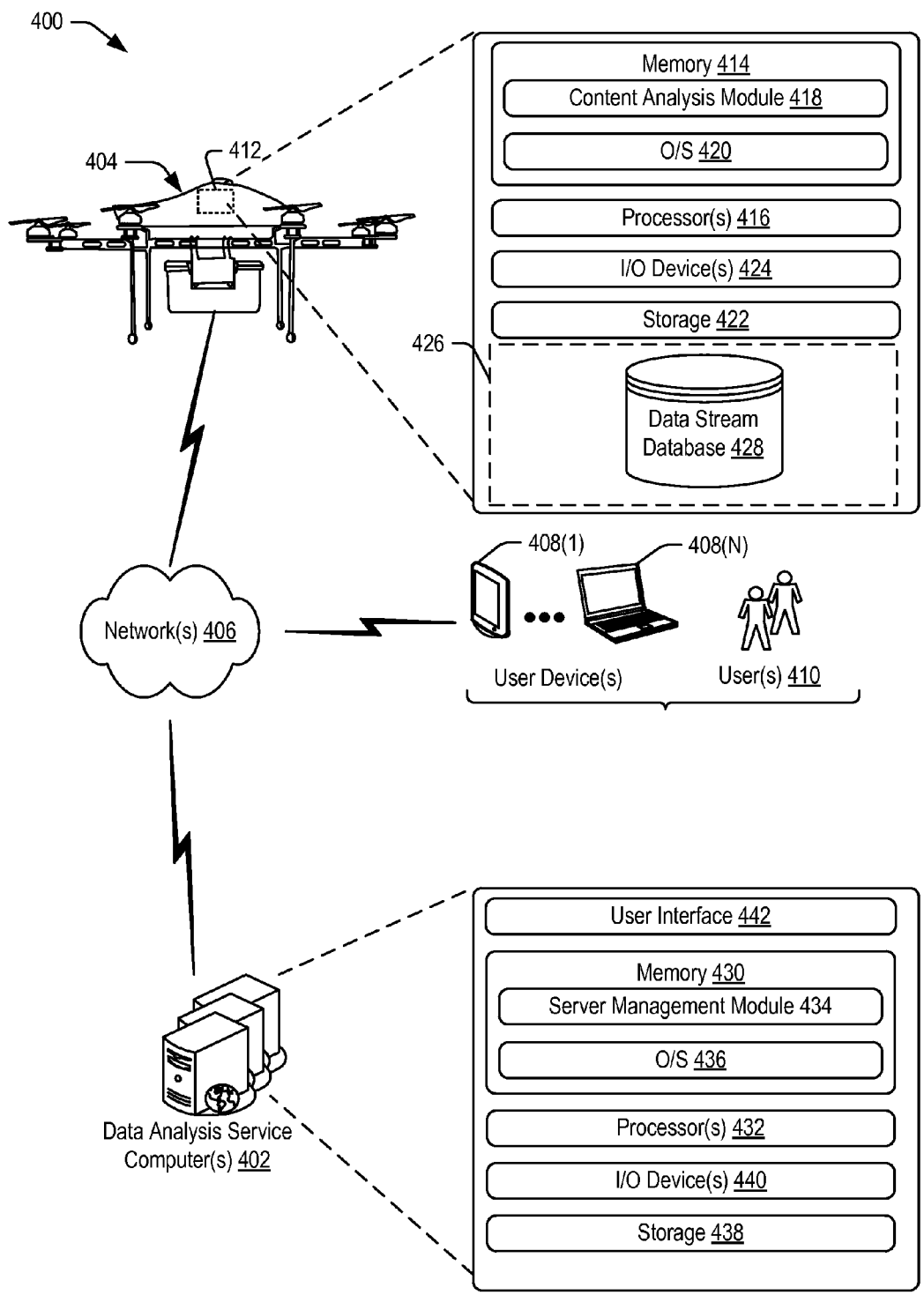
FIG. 4 illustrates an example schematic architecture and devices for implementing techniques relating to a data analysis service associated with delivering an item as described herein, according to embodiments.

FIG. 4 illustrates an example schematic architecture and devices for implementing techniques relating to a data analysis service associated with delivering an item as described herein, according to embodiments. The architecture 400 may include data analysis service computers 402. The data analysis service computers 402 may be included as part of an electronic marketplace (not shown) and interface with purchase and delivery services of the electronic marketplace. In this manner, the data analysis service computers 402 may coordinate delivery of items via UAVs, such as UAV 404, to customers of the electronic marketplace. The UAV 404 is an example of the UAV 300 discussed previously. In some examples, the data analysis service computers 402 may be a stand-alone service operated on its own or in connection with an electronic marketplace. In either example, the data analysis service computers 402 may be in communication with the UAV 404 via one or more network(s) 406 (hereinafter, "the network 406"). The network 406 may include any one or a combination of many different types of networks, such as cable networks, the Internet, wireless networks, cellular networks, radio networks, and other private and/or public networks. Thus, the data analysis service computers 402 may be configured to provide back-end control of the UAV 404 prior to, during, and after completion of its delivery plan. As discussed previously, in some examples, the UAV 404 may be configured to accomplish its delivery plan (e.g., deliver its payload) with little to no communication with the data analysis service computers 402.

User devices 408(1)-408(N) (hereinafter, "the user device 408") may also be in communication with the data analysis service computers 402 and the UAV 404 via the network 406. The user device 408 may be operable by one or more human users 410 (hereinafter, "the human user 410") to access the data analysis service computers 402 (or an electronic marketplace) and the UAV 404 via the network 406. In some examples, such connectivity may enable the human user 410 to interact with the UAV 404 according to techniques described herein. The user device 408 may be any suitable device capable of communicating with the network 406. For example, the user device 408 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 408 may be in communication with the data analysis service computers 402 via one or more web servers constituting an electronic marketplace (not shown) connected to the network 406 and associated with the data analysis service computers 402.

Turning now to the details of the UAV 404, the UAV 404 may include an onboard computer 412 including at least one memory 414 and one or more processing units (or processor (s)) 416. The processor(s) 416 may be implemented as appropriate in hardware, computer-executable instructions, software, firmware, or combinations thereof. Computer-executable instruction, software, or firmware implementations of the processor(s) 416 may include computer-executable or machine-executable instructions written in any suitable programming language to perform the various functions described. The memory 414 may include more than one memory and may be distributed throughout the onboard computer 412. The memory 414 may store program instructions (e.g., content analysis module 418) that are loadable and executable on the processor(s) 416, as well as data generated during the execution of these programs. Depending on the configuration and type of memory including the content analysis module 418, the memory 414 may be volatile (such as random access memory (RAM)) and/or non-volatile (such as read-only memory (ROM), flash memory, or other memory). The content analysis module 418 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM. Turning to the contents of the memory 14 in more detail, the memory 414 may include an operating system 420 and one or more application programs, modules or services for implementing the features disclosed herein including at least the content analysis module 418.

In some examples, the onboard computer 412 may also include additional storage 422, which may include removable storage and/or non-removable storage. The additional storage 422 may include, but is not limited to, magnetic storage, flash media storage, optical disks, and/or tape storage. The disk drives and their associated computer-readable media may provide non-volatile storage of computer-readable instructions, data structures, program modules, and other data for the computing devices.

The memory 414 and the additional storage 422, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 412. The modules of the onboard computer 412 may include one or more components. The onboard computer 412 may also include input/output (I/O) device(s) and/or ports 424, such as for enabling connection with a keyboard, a mouse, a pen, a voice input device, a touch input device, a display, speakers, a printer, or other I/O device. The I/O device(s) 424 may enable communication with the other systems of the UAV 404 (e.g., other parts of the control system, power system, communication system, navigation system, propulsion system, and the retaining system).

The onboard computer 412 may also include data store 426. The data store 426 may include one or more databases, data structures, or the like for storing and/or retaining information associated with the UAV 404. In some examples, the data store 426 may include databases, such as data stream database 428. Within the data stream database 428 may be stored any suitable data obtained by the UAV 404 in implementing and/or affecting its delivery plan.

Turning now to the details of the user device 408. The user device 408 may be used by the human user 410 for interacting with the data analysis service computers 402 and, in some cases, the UAV 404. The user device 408 may therefore include a memory, a processor, a user-interface, a web-service application, and any other suitable feature to enable communication with the features of architecture 400. The web service application may be in the form of a web browser, an application programming interface (API), virtual computing instance, or other suitable application. In some examples, when the data analysis service computers 402 is part of, or shares an association with, an electronic marketplace, the user device 408 may be used by the human user 410 for procuring one or more items from the electronic marketplace. The human user 410 may request delivery of the purchased item(s) using the UAV 404, or the data analysis service computers 402 may coordinate such delivery on its own. In some examples, the human user 410 may use the user device 408 to direct the UAV 404 during delivery and/or to authenticate its identity prior to the UAV 404 delivering its payload.

Turning now to the details of the data analysis service computers 402, the data analysis service computers 402 may include one or more service provider computers, perhaps arranged in a cluster of servers or as a server farm, and may host web service applications. These servers may be configured to host a website (or combination of websites) viewable via the user device 408. The data analysis service computers 402 may include at least one memory 430 and one or more processing units (or processor(s)) 432. The processor(s) 432 may be implemented as appropriate in hardware, computer-executable instructions, software, firmware, or combinations thereof. Computer-executable instruction, software, or firmware implementations of the processor(s) 432 may include computer-executable or machine-executable instructions written in any suitable programming language to perform the various functions described. The memory 430 may include more than one memory and may be distributed throughout the data analysis service computers 402. The memory 430 may store program instructions (e.g., server management module 434) that are loadable and executable on the processor(s) 432, as well as data generated during the execution of these programs. Depending on the configuration and type of memory including the server management module 434, the memory 430 may be volatile (such as random access memory (RAM)) and/or non-volatile (such as read-only memory (ROM), flash memory, or other memory). The data analysis service computers 402 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 430 may include multiple different types of memory, such as static random access memory (SRAM), dynamic random access memory (DRAM), or ROM. Turning to the contents of the memory 430 in more detail, the memory 430 may include an operating system 436 and one or more application programs, modules or services for implementing the features disclosed herein including at least the server management module 434. The server management module 434, in some examples, may function similarly to the content analysis module 418. For example, when the UAV 404 is in network communication with the data analysis service computers 402, the UAV 404 may receive at least some instructions from the data analysis service computers 402 as the server management module 434 is executed by the processors 432. In some examples, the UAV 404 executes the content analysis module 418 to operate independent of the data analysis service computers 402.

In some examples, the data analysis service computers 402 may also include additional storage 438, which may include removable storage and/or non-removable storage. The additional storage 438 may include, but is not limited to, magnetic storage, flash media storage, optical disks, and/or tape storage. The disk drives and their associated computer-readable media may provide non-volatile storage of computer-readable instructions, data structures, program modules, and other data for the computing devices.

The memory 430 and the additional storage 438, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the data analysis service computers 402. The data analysis service computers 402 may include one or more components. The data analysis service computers 402 may also include input/output (I/O) device(s) and/or ports 440, such as for enabling connection with a keyboard, a mouse, a pen, a voice input device, a touch input device, a display, speakers, a printer, or other I/O device.

In some examples, the data analysis service computers 402 may include a user interface 442. The user interface 442 may be utilized by an operator, or other authorized user to access portions of the data analysis service computers 402. In some examples, the user interface 442 may include a graphical user interface, web-based applications, programmatic interfaces such as application programming interfaces (APIs), or other user interface configurations. The data analysis service computers 402 may store a larger amount of information in the storage 438 than the onboard computer 412 is capable of storing in the data store 428. Thus, in some examples, at least a portion of the information from the databases in the data store 428 is copied to the databases of the storage 438, e.g., periodically, occasionally, in connection with an event, or otherwise. In this manner, the storage 438 may have up-to-date information, without having to maintain the databases. In some examples, this information may be transferred as part of a delivery plan prior to the UAV 404 beginning a delivery mission.

Figure 5:
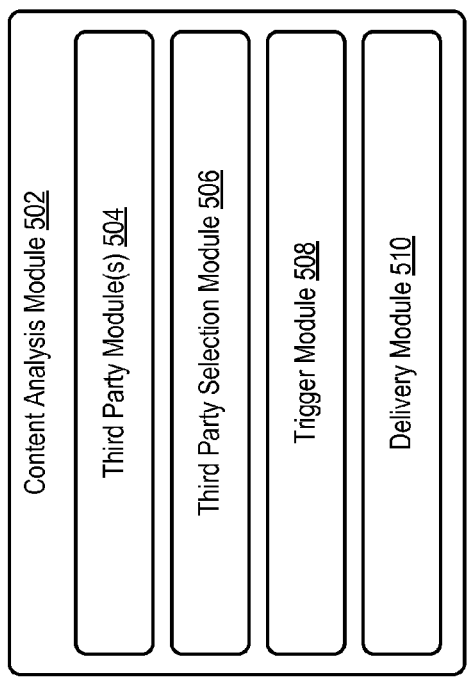
FIG. 5 illustrates an example content analysis module that may be utilized in implementing the data analysis service as described herein, according to embodiments.

Turning next to the details of the content analysis module 418 stored in the memory 414 of the onboard computer 412, in FIG. 5, example schematic device 500 is illustrated including content analysis module 502. The content analysis module 502 is an example of the content analysis module 418 and the server management module 434. The content analysis module 502 will be described from the reference point of an example UAV, but its function is not limited to controlling a UAV. The content analysis module 502 may be configured to manage one or more sub-modules, components, and/or services directed to embodiments disclosed herein. In some examples, the content analysis module 502 may include third party modules 504, a third party selection module 506, a trigger module 508, and a delivery module 510. While these modules and components are illustrated in FIG. 5 and will be described as performing discrete tasks, it is understood that FIG. 5 illustrates example configurations and other configurations performing other tasks and/or similar tasks as those described herein may be implemented according to the techniques described herein. Other modules (not shown) may perform the same tasks as the content analysis module 502 or other tasks and may be implemented in a similar fashion or according to other configurations. The modules included within and including the content analysis module 502 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggest in FIG. 5 or may exist as separate modules.

In accordance with at least one embodiment, the content analysis module 502 may be configured to identify properties in obtained or received data utilizing image recognition techniques, video data pattern recognition techniques, and audio recognition techniques described herein. The content analysis module 502 may be configured to utilize a supervised machine learning algorithm to identify properties as described herein. In embodiments, the content analysis module 502 may be configured to obtain and maintain one or more property baselines about a location. The machine learning algorithm may use the recently received/obtained data and the property baselines to identify any anomalies, inconsistencies, irregularities, or aberrations that deviate from an expected or normal state for an object, location, environmental factor, or metric as indicated by the property baselines for a location. In an embodiment, the content analysis module 502 may be configured to specify and maintain one or more thresholds for a variety of environmental factors including audio thresholds, temperature thresholds, moisture thresholds, and wind speed thresholds that can be utilized by the trigger module 508 as described below.

The content analysis module 502 may maintain opt-in and opt-out statuses for a plurality of users associated with the data analysis service described herein. A user may opt-in or opt-out via by interacting with a variety of platforms provided by the data analysis service and associated electronic marketplace such as an opt-in/opt-out button, email, user interface element, or native application notification. As such, users who wish to participate in the features described herein that are associated with the data analysis service may opt-in and authorize audio, visual, or other suitable data to be captured and analyzed by the unmanned aerial vehicles as they deliver items. Users who do not wish to participate in or be associated with the data analysis service may opt-out and avoid data to be captured by the unmanned aerial vehicles as they deliver items or travel from a source destination to a delivery destination as described herein. Instructions may be provided to the unmanned aerial vehicles to turn off or cease capturing data for locations that correspond to users that have opted-out and/or the delivery plan for the unmanned aerial vehicles may be modified to divert from or avoid altogether locations associated with the opted-out users. In embodiments, the data analysis service may be associated with an electronic marketplace and the content analysis module 502 may update demographics or information associated with a user such as updating user profile information maintained by the electronic marketplace on behalf of the user. For example, the unmanned aerial vehicle may capture image data that indicates that a particular user owns a particular brand of car. Thereafter, the content analysis module 502 may provide instructions, or perform through its own functionality, to update the user profile to include information about the particular brand of car. Recommendations for items and services may be generated based at least in part on the data obtained and analyzed by the content analysis module 502. In accordance with at least one embodiment, the content analysis module 502 may be configured to generate and provide recommendations for services or items to nearby users of a user that has ordered an item. For example, the content analysis module 502 may identify a number of pests (wasps, rats) while delivering an item to a particular user within a neighborhood. Subsequently, any nearby users that opt-in to the data analysis service or visit a web page associated with the electronic marketplace may receive a recommendation for pest control services.

In accordance with at least one embodiment, the third party selection module 506 may be configured to provide an indication of captured data from an unmanned aerial vehicle to one or more third parties that are associated with the data analysis service described herein. The third party selection module 506 may request responses from the one or more third parties regarding the indication of captured data. Requests from the third party selection module 506 may include monetary amounts in the form of bids from one or more third parties that offer similar services (such as competing roof repair services), or values that may be compared to a threshold that is maintained by the third party selection module 506. For example, a value could include a monetary value, such as a bid, that must exceed a particular threshold before data is provided to the third party. In some examples, the value may include a period of time before data analysis and action can be taken by a particular third party, or amount of bandwidth usage required by a particular third party, that can be compared to a threshold for selection by the third party selection module 506. The third party selection module 506 may select a particular third party based at least in part on the request and the response given by a particular third party. In embodiments, a third party may only be given an indication about the captured data if the third party has provided a third party module to associate with the unmanned aerial vehicle. In some embodiments, any participating third party may be provided the indication about the captured data and be allowed to request the data.

In accordance with at least one embodiment, the third party modules 504 may be configured to provide the captured data from an unmanned aerial vehicle while delivering an item to a third party or a third party provided module associated with the unmanned aerial vehicle based on instructions or an indication from the third party selection module 506 described herein. The third party modules 504 may be configured to generate and provide a recommendation that includes services and items based on the identified properties included in the data. In embodiments, the third party modules 504 may be configured to employ distinct or different image recognition techniques, video data pattern recognition techniques, and audio recognition techniques utilized by the data analysis service to identify properties in the captured data from the unmanned aerial vehicle. The third party modules 504 may be configured to provide instructions to navigate or direct the unmanned aerial vehicle in response to identifying particular properties such as by instructing the unmanned aerial vehicle to perform a more detailed sweep of a particular portion of the location (zoom in to the damaged roof). The recommendation generated by the third party modules 504 may include information or instructions to be taken by the user associated with a particular location based at least in part on the identified properties.

In accordance with at least one embodiment, the trigger module 508 may be configured to generate and provide recommendations based at least in part on low pass properties identified by the content analysis module 502. For example, the content analysis module 502 may identify that a particular delivery location has a pool. The trigger module 508 may utilize the identified property (owning a pool) to generate and provide a recommendation that includes services and items related to pool maintenance that can be provided to a user associated with the particular delivery location. In embodiments, the trigger module 508 may be configured to generate and provide recommendations based on identified properties such as structural disrepair, dead grass, etc., that can be identified from a more detailed property identification analysis described herein.

The trigger module 508 may be configured to maintain and update a number of immediate triggers associated with particular identified properties. For example, immediate triggers may be associated with identified properties of smoke from a building, gunshot sounds, cries for help, glass breaking, heavy areas of traffic, etc. The trigger module 508 may be configured to maintain and implement a number of policies that include instructions for the unmanned vehicle to perform or a pilot or technician associated with the unmanned vehicle to take upon identifying an appropriate trigger. The trigger module 508 may provide instructions for the data analysis service computers to perform such as immediate recording, data analysis, or contacting a human operator to aid in resolving situations included in identified properties for a location. The trigger module 508 may be configured to utilize data from the content analysis module 502, such as environmental factors, to generate and provide instructions to the unmanned aerial vehicle. For example, rises in temperature (indicating a fire) may result in instructions that indicate the contacting of emergency services and updating a delivery plan for the particular unmanned aerial vehicle that detected the particular property. In an embodiment, the trigger module 508 may maintain one or more policies that specify a particular megapixel or fidelity recording standard for the image capturing device associated with the unmanned aerial vehicle to adhere to when flying at a certain height. For example, the policy may specify that the unmanned aerial vehicle can capture and record data at a high fidelity rate when above a particular height and record at a lower fidelity rate upon descending below the particular height (which may occur based on the delivery plan or when delivering the item). In embodiments, the specification of the policy for fidelity rates may serve as a trigger for the capturing device associated with the unmanned aerial vehicle to begin capturing data. In embodiments, the one or more policies maintained by the trigger module 508 may indicate that a delay or buffer be introduced between capture and analysis to allow for applying the policy and determine if the policy is violated. For example, a policy may specify that if a child is detected in the captured data then recording should cease. A policy may indicate that data already captured, upon a certain violation of the policy or trigger, be deleted for a certain time period (e.g., last five minutes).

In accordance with at least one embodiment, the delivery module 510 may be configured to receive and process security sweep requests from users associated with the data analysis service. For example, users may opt-in, pay, or request that unmanned aerial vehicles deviate from a particular delivery plan, or return trajectory, to perform a security sweep of their property. The unmanned aerial vehicle may receive instructions to alter trajectory and flight plan upon entering a particular geo-fence associated with the requesting entity for the security sweep. The delivery module 510 may be configured to provide instructions to the unmanned aerial vehicle to perform particular flight paths to capture more detailed information (detailed sweep of an area as opposed to a quick sweep). The delivery module 510 may provide such instructions based at least in part on properties identified by the content analysis module 502 or the trigger module 508 as described herein. The delivery module 510 may be configured to implement at least portions of the delivery plan relating to item delivery. In embodiments, the delivery module 510 may be configured to calculate, adjust, receive, or determine coarse positioning or navigation instructions and fine positioning or navigation instructions. This may include, in some examples, determining trajectory adjustments to a flight path of a UAV.

Figure 6:
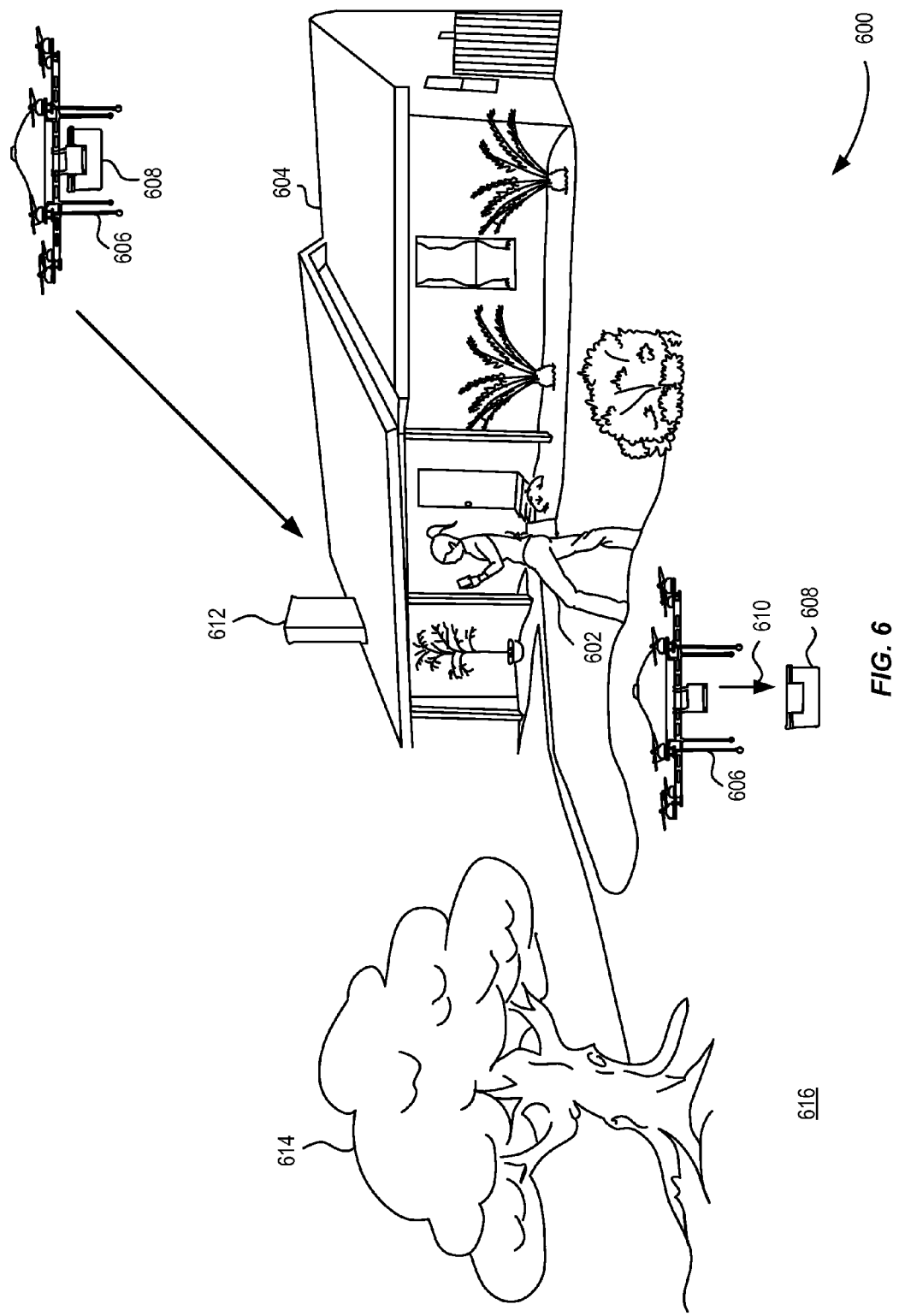
FIG. 6 illustrates an example diagram depicting techniques relating to a data analysis service associated with delivering an item as described herein, according to embodiments.

FIG. 6 illustrates an example diagram depicting techniques relating to a data analysis service associated with delivering an item as described herein, according to embodiments. FIG. 6 includes a particular location 600, a user 602, and a home associated with the user 604. FIG. 6 also includes an unmanned aerial vehicle 606 delivering an item 608 to the home 604. As the unmanned aerial vehicle 606 delivers 610 the item 608 (indicated by the arrow), the unmanned aerial vehicle 606 may be configured to capture data such as video data and audio data from the particular location 600. FIG. 6 illustrates the unmanned aerial vehicle 606 approaching the home 604 from an aerial point and thus being able to capture various data about the particular location. For example, the unmanned aerial vehicle 606 may obtain data about the house 604 itself such as the presence of a chimney 612, the state of a nearby tree 614, or the state of the lawn 616.

In embodiments, the data analysis service computers may receive the captured data and identify properties associated with the tree 614 or lawn 616 and provide instructions to the unmanned aerial vehicle 606 to communicate with the user 602 (if present during delivery). For example, instructions may be provided to query the user 602 if they would like to hear about offers from local services that can help with the state of the tree 614 or the lawn 616. In some embodiments, the data analysis computers may generate and provide a recommendation based on properties identified about the tree 614 or the lawn 616 that can be provided to the user 602 via a user device. The recommendation may be generated and provided in real-time or at a later time after the expiration of a particular time period. The analysis of the data and identifying of properties included in the data and actions described above with reference to FIG. 6 may be performed by computer components associated with the unmanned aerial vehicle 606 thus obviating the communication of data to the data analysis service computers, as described herein.

Figure 7:
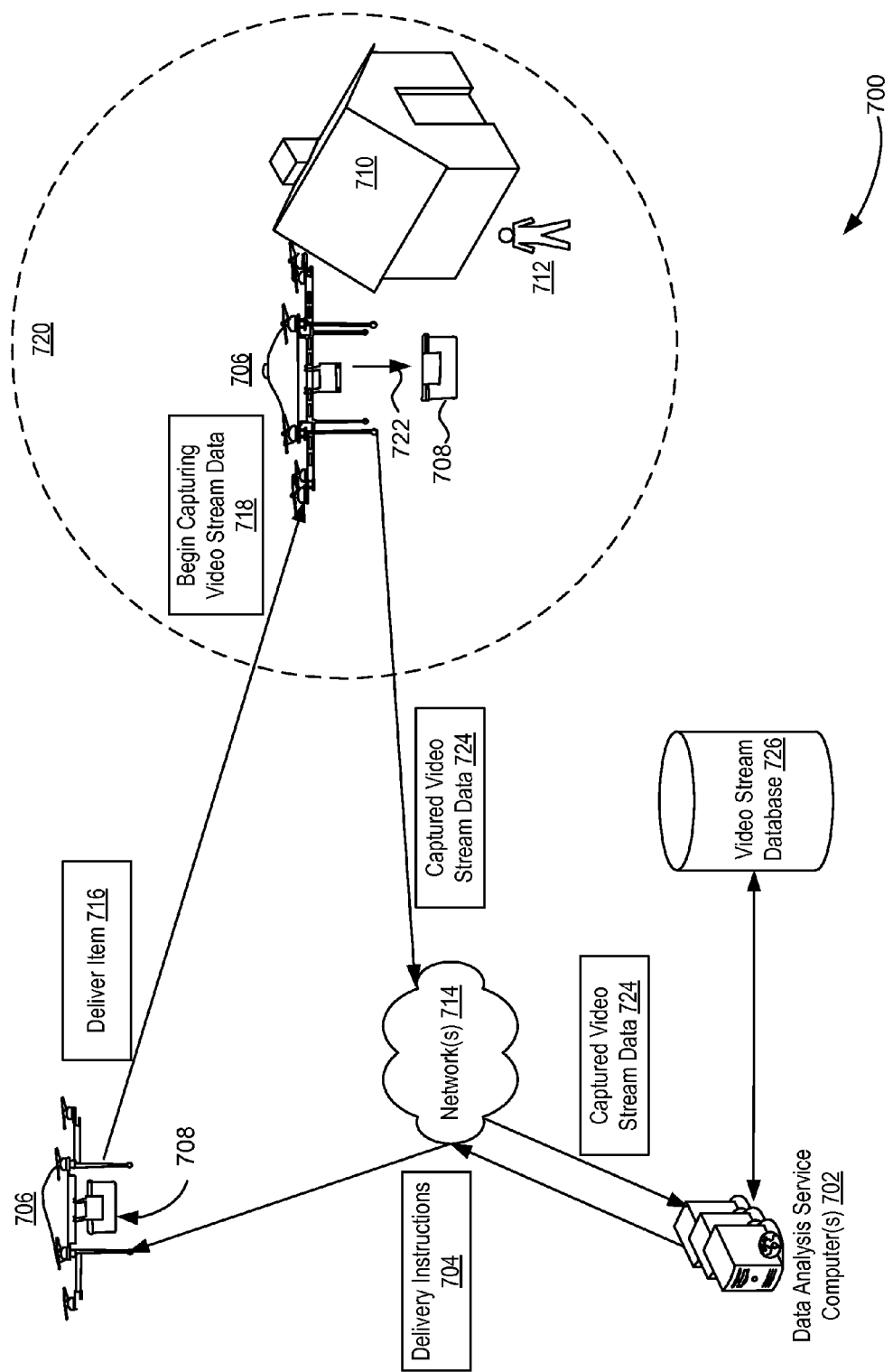
FIG. 7 illustrates an example data flow for a data analysis service associated with delivering an item as described herein, according to embodiments.

FIG. 7 illustrates an example data flow 700 for a data analysis service associated with delivering an item as described herein, according to embodiments. The data flow 700 includes data analysis service computers 702 providing delivery instructions 704 to an unmanned aerial vehicle 706 to deliver an item 708. In accordance with at least one embodiment, the delivery instructions 704 may include a delivery plan that includes a location, such as home 710, associated with a user 712 that ordered item 708. The delivery instructions 704 may be provided over one or more networks 714. In the data flow 700, as the unmanned aerial vehicle 706 delivers 716 the item 708 to the home 710, the unmanned aerial vehicle 706 may begin capturing video data 718 upon entering a geo-fence 720 associated with the home 710. The unmanned aerial vehicle 706 may continue to capture video data 718 while in the area included in the geo-fence 720 and delivering 722 the item 708 to the user 712 at the home 710. In embodiments, the unmanned aerial vehicle 706 may locally store the captured video data 718 before entering the geo-fence 720 and analyze the data locally to identify a trigger (such as the geo-fence). Upon identifying the trigger, the unmanned aerial vehicle 706 may begin capturing the video data 718 and providing it to the data analysis service computers 702 for further analysis and storage.

In an embodiment, the video stream data 718 may be captured by an image capturing device associated with the unmanned aerial vehicle 706. The video stream data 718 may include images and video data captured by the unmanned aerial vehicle 706 during its delivery plan within the geo-fence 720 and can include any suitable data captured while in flight within the geo-fence 720 and delivering 722 the item 708 to the home 710. For example, the video stream data 118 may include video recordings of the house and any other suitable object within the geo-fence 720 such as trees, yard, driveway, etc. In accordance with at least one embodiment, the unmanned aerial vehicle 706 may provide the captured video stream data 724, via the one or more networks 714, to the data analysis service computers 702. The unmanned aerial vehicle 706 may provide the captured video stream data 724 in a real time continuous stream, periodically, or locally store the captured video stream data 724 until it lands or is near a source location that is associated with the data analysis service computers 702. In embodiments, the source location may be a fulfillment center, warehouse, data center, or other structure that is associated with an electronic marketplace. In some examples, the source location may be a warehouse, data center, or other structure that is associated with the data analysis services or one or more third parties. As described herein, the unmanned aerial vehicle 706 may identify properties associated with the home 710 or area included in the geo-fence 720 to generate and provide recommended items or services or the data analysis service computers 702 can perform similar functions.

Figure 8:
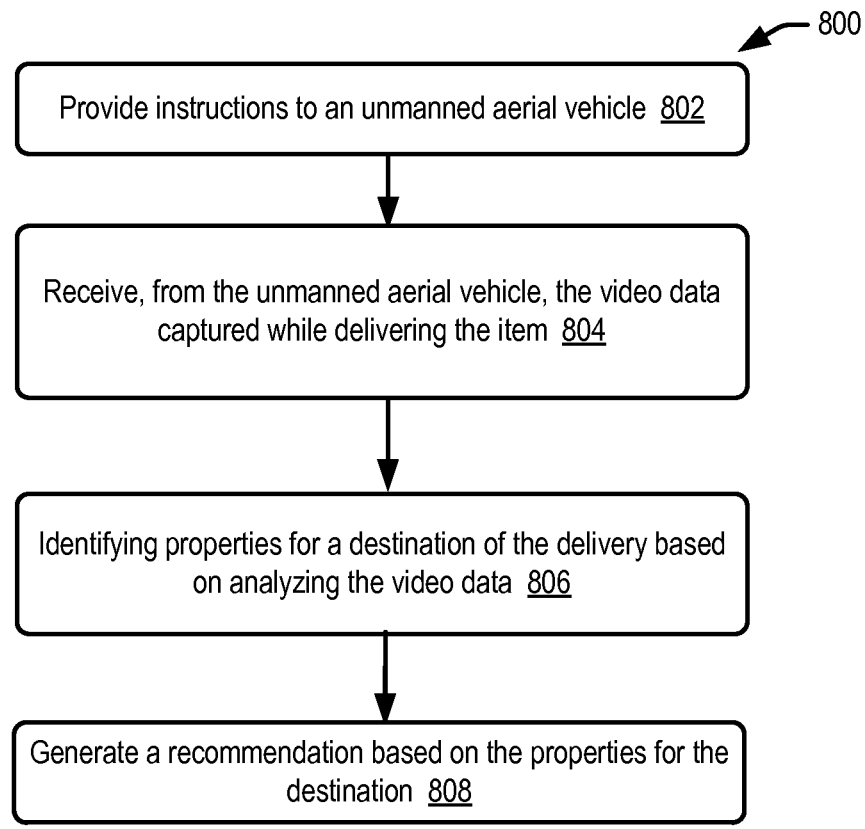
FIG. 8 illustrates an example flow diagram for a data analysis service associated with delivering an item as described herein, according to embodiments.

FIG. 8 illustrates an example flow diagram for a data analysis service associated with delivering an item as described herein, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processor, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, one or more data analysis service computers (e.g., utilizing at least one of a content analysis module 502, a third party module 504, a third party selection module 506, a trigger module 508, and a delivery module 510) shown in FIGS. 4 and 5 may perform the processes 8 of FIG. 8. In FIG. 8, the process 800 may include providing instructions to an unmanned aerial vehicle at 802. In embodiments, the instructions may be included or comprise a delivery plan that instructs the unmanned aerial vehicle to deliver a particular item to a particular location by following one or more navigation commands as described herein. The process 800 may include receiving, from the unmanned aerial vehicle, the video data captured while delivering the item at 804. In accordance with at least one embodiment, the unmanned aerial vehicle may be configured to utilized or associated with one or more visual, audio, or environmental sensors for capturing audio, visual, and environmental data while in flight and delivering the item to the particular location indicated by the delivery plan.

The process 800 may include identifying properties for a destination of the delivery based on analyzing the video data at 806. As described herein, the unmanned aerial vehicle may be configured to identify properties such as inconstancies associated with the destination or it may provide the captured data to the data analysis service computers for identification of the properties. Video pattern recognition technologies, image recognition technologies, or audio recognition technologies such as sound triangulation techniques may be utilized to identify the properties within the data. The process 800 may conclude at 808 by generating a recommendation based at least in part on the properties for the destination. For example, if the identified properties for a user's home indicate that their roof is in disrepair, a generated recommendation may include information about services for roof repair or tools and items that can aid in repairing ones roof. In embodiments, the items and services may be associated and offered by an electronic marketplace.

Figure 9:
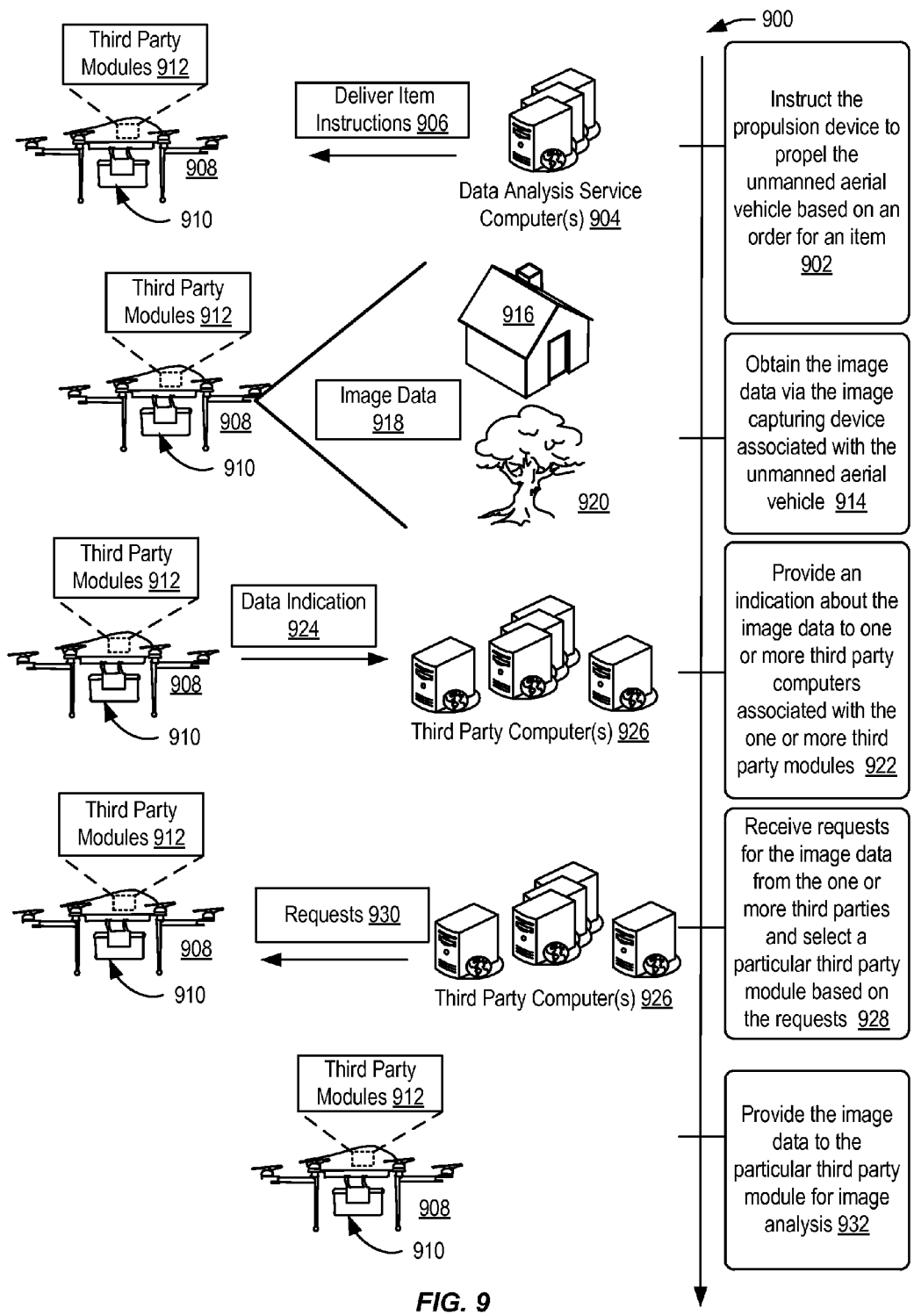
FIG. 9 illustrates an example data flow for a data analysis service associated with delivering an item as described herein, according to embodiments.

FIG. 9 illustrates an example data flow for a data analysis service associated with delivering an item as described herein, according to embodiments. The example data flow 900 illustrated in FIG. 9 includes one or more operations. However, the order in which the operations are described is not intended to be construed as a limitation, and any number of the described operations can be combined in any order and/or in parallel to implement the described flow. The flow 900 may include instructing the propulsion device to propel the unmanned aerial vehicle based on an order for an item at 902. For example, data analysis service computers 904 may generate and provide deliver item instructions 906 to an unmanned aerial vehicle 908 that instructs the delivery of item 910 by the unmanned aerial vehicle 908. The unmanned aerial vehicle 908 may be configured to implement one or more third party modules 912. The deliver item instructions 906 may include a delivery plan as described herein.

The flow 900 may include obtaining data, such as image data, via the image capturing device associated with the unmanned aerial vehicle at 914. In embodiments, as the unmanned aerial vehicle 908 approaches the delivery destination 916 image data 918 may be captured that includes images of the delivery destination 916 and surrounding objects such as a tree 920. As described herein, the unmanned aerial vehicle 908 may be configured to utilize a number of data capturing devices including audio, video, or environmental sensors or data capturing devices to obtain data while delivering the item to a location. The flow 900 may include providing an indication about the image data to one or more third party computers associated with the one or more third party modules at 922. For example, the unmanned aerial vehicle 908 may provide a data indication 924 to one or more third party computers 926 via one or more networks. The one or more third party modules 912 may include identification information that can be utilized by the unmanned aerial vehicle 908 communication capabilities to provide the data indication 924 to the appropriate third party computers 926.

The flow may include receiving requests for the image data from the one or more third parties and selecting a particular third party module based on the requests at 928. For example, the third party computers 926 that received the data indication 924 may provide requests for the image data 918 that include monetary bids. In an embodiment, the unmanned aerial vehicle 908 or the data analysis service computers 904 may compare the one or more requests (bids) to a threshold or compare the bids to each other to select the appropriate third party to receive and process the image data 918. The flow 900 may conclude at 932 by providing the image data to the particular third party module for image analysis. In embodiments, the unmanned aerial vehicle 908 may include an on-board computer for granting access to the selected third party module 912 as selected based on the requests 930 for image analysis as described herein. In accordance with at least one embodiment, the unmanned aerial vehicle 908 or the data analysis service computers 904 may provide the image data 918 to the appropriate third party computer 926 for image analysis and identification of properties.

In accordance with at least one embodiment, the unmanned aerial vehicle 908 may return to a source location associated with the data analysis service computers 904 (origination point where the UAV 908 was sent from as described herein) to perform analysis and request bids from third parties (third party computers 926). The data analysis service computers 904 may perform one or more anonymizing actions on the image data 918 to protect the identity of any users captured while delivering the item 906. In some embodiments, the data analysis service computers 904 may blur images of people, addresses, or other suitable identification marks to protect the privacy of users before providing the data to third parties or third party computers 926. The data analysis service computers may generate a location grid that aids in anonymizing the data before providing the captured data 918 to the third parties or third party computers 926. For example, a grid location for a particular delivery destination may be generated (e.g., point A in grid location B) and provided to the third party computers 926 to help protect the privacy of users associated with the data analysis service described herein. It should be appreciated that although FIG. 9 illustrates a particular third party module, party, or entity being selected based on the requests and indications, one or more third parties may be selected to allow access to the captured data based on the number of indications and requests received.

Figure 10:
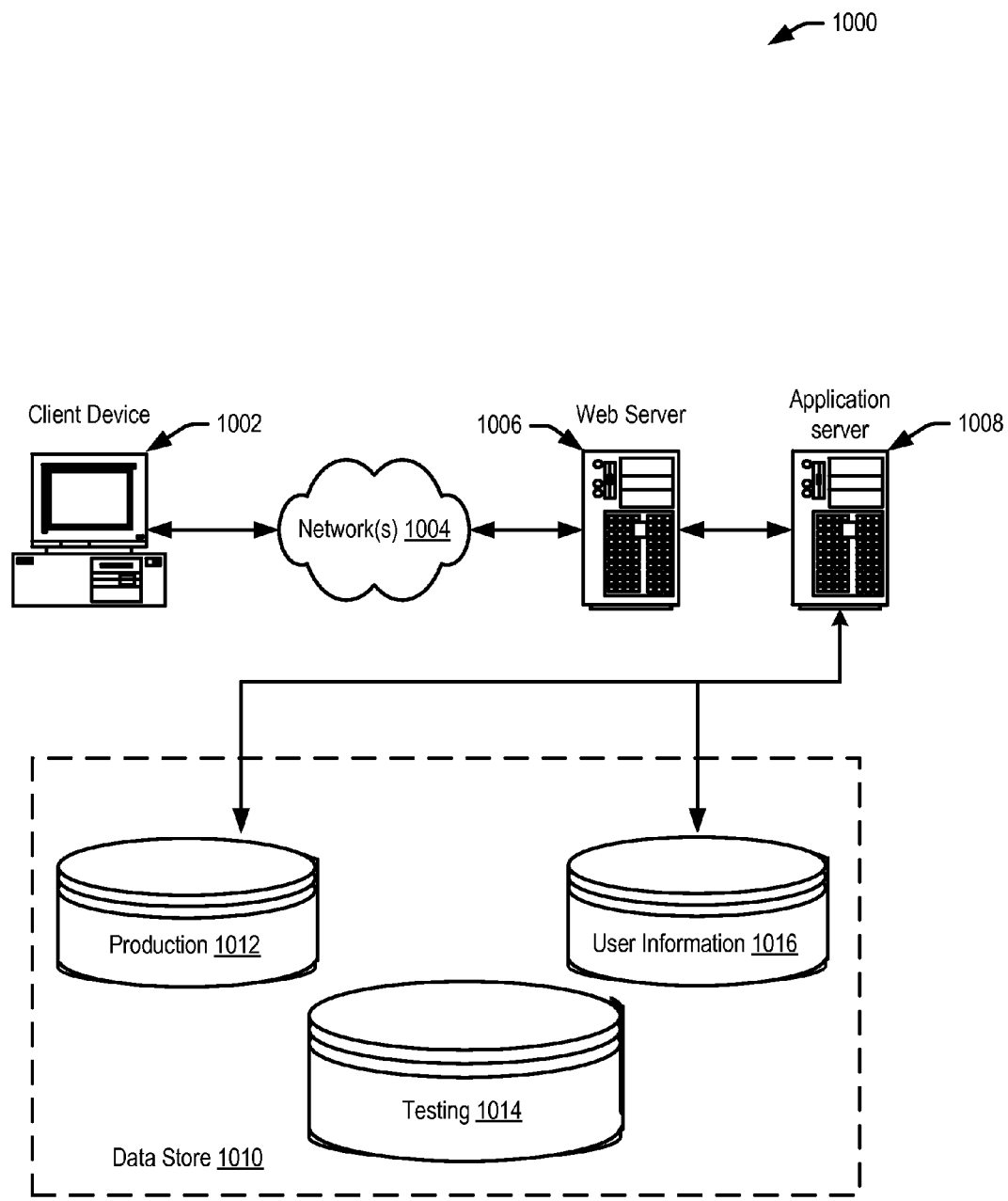
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle ("UAV") comprising:
   an image capturing device associated with the UAV and configured to capture image data;
   memory that stores computer-executable instructions; and
   at least one processor configured to access the memory and execute the computer-executable instructions to at least:
      execute a management system in communication at least with the image capturing device, the management system comprising:

an image recognition module for identifying properties included in the image data and maintaining a policy associated with the identified properties, the policy indicating a trigger for capturing the image data with the image capturing device;

receive instructions to deliver an item;

instruct the image capturing device to capture the image data while delivering the item and after delivering the item based at least in part on the policy and a location of the UAV upon returning to a source location and a geo-fence associated with a user location corresponding to delivery of the item; and provide the captured image data to a computer system.

2. The UAV of claim 1, wherein instructing the image capturing device to capture the image data is further based at least in part on the trigger of the policy exceeding a threshold associated with the policy.

3. The UAV of claim 1, wherein the trigger for capturing the image data with the image capturing device is based at least in part on the geo-fence associated with the user location corresponding to delivery of the item.

4. The UAV of claim 1, wherein the at least one processor is further configured to store the captured image data in the memory of the unmanned aerial vehicle.

5. The UAV of claim 1, wherein providing the captured image data to the computer system includes relaying the captured image data to one or more other unmanned aerial vehicles that are delivering one or more items.

6. The UAV of claim 1, wherein the providing the captured image data to the computer system includes providing the captured image data to a user device of a user that is a recipient of the item.

7. A computer-implemented method, comprising:

maintaining, by a first computer system of an unmanned aerial vehicle ("UAV"), a policy that indicates a trigger for capturing image data with an image capturing device of the UAV;

identifying, by the first computer system utilizing an image recognition module, properties included in the image data;

receiving, by the first computer system, instructions to deliver an item;

instructing, by the first computer system, the image capturing device to capture the image data while delivering the item and after delivering the item based at least in part on the policy and a location of the UAV upon returning to a source location and a geo-fence associated with a user location corresponding to delivery of the item; and providing, by the first computer system, the captured image data to a second computer system.

8. The computer-implemented method of claim 7, wherein instructing the image capturing device to capture the image data is further based at least in part on the trigger of the policy exceeding a threshold associated with the policy.

9. The computer-implemented method of claim 7, wherein the trigger for capturing the image data with the image capturing device is based at least in part on the geo-fence associated with the user location corresponding to delivery of the item.

10. The computer-implemented method of claim 7, further comprising storing, in memory of the first computer system, the captured image data.

11. The computer-implemented method of claim 7, wherein providing the captured image data to the second computer system includes providing the captured image data to a user device of a user that is a recipient of the item.

12. One or more non-transitory computer-readable media storing computer-executable instructions that, when executed by one or more computer systems of an unmanned aerial vehicle ("UAV"), configure the one or more computer systems to perform operations comprising:

maintaining a policy that indicates a trigger for capturing image data with an image capturing device of the UAV;

identifying, utilizing an image recognition module, properties included in the image data;

receiving instructions to deliver an item;

instructing the image capturing device to capture the image data while delivering the item and after delivering the item based at least in part on the policy and a location of the UAV upon returning to a source location and a geo-fence associated with a user location corresponding to delivery of the item; and providing the captured image data to a computer system.

13. The one or more non-transitory computer-readable media of claim 12, wherein the trigger for capturing the image data with the image capturing device is based at least in part on the geo-fence associated with the user location corresponding to delivery of the item.

14. The one or more non-transitory computer-readable media of claim 12, wherein instructing the image capturing device to capture the image data is further based at least in part on the trigger of the policy exceeding a threshold associated with the policy.

15. The one or more non-transitory computer-readable media of claim 12, wherein the instructions further configure the one or more computer systems to perform operations comprising storing the captured image data.

16. The one or more non-transitory computer-readable media of claim 12, wherein providing the captured image data to the computer system includes providing the captured image data to a user device of a user that is a recipient of the item.

17. The one or more non-transitory computer-readable media of claim 12, wherein providing the captured image data to the computer system includes relaying the captured image data to one or more other unmanned aerial vehicles that are delivering one or more items.

* * * * *